United States Patent
Qaraqe et al.

(10) Patent No.: US 11,533,214 B2
(45) Date of Patent: Dec. 20, 2022

(54) SPECTRAL EFFICIENT UPLINK MULTIPLE ACCESS TECHNIQUES USING INDEX MODULATION

(71) Applicant: Qatar Foundation for Education, Science and Community Development, Doha (QA)

(72) Inventors: Khalid Qaraqe, Doha (QA); Raed Mesleh, Amman (JO); Saud Althunibat, Al Karak (JO)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 13 days.

(21) Appl. No.: 16/901,567

(22) Filed: Jun. 15, 2020

(65) Prior Publication Data

US 2020/0396038 A1 Dec. 17, 2020

Related U.S. Application Data

(60) Provisional application No. 62/861,431, filed on Jun. 14, 2019.

(51) Int. Cl.
| | |
|---|---|
| *H04L 5/00* | (2006.01) |
| *H04W 72/04* | (2009.01) |
| *H04L 27/30* | (2006.01) |
| *H04W 16/14* | (2009.01) |
| *H04L 27/26* | (2006.01) |

(52) U.S. Cl.
CPC ............ *H04L 27/30* (2013.01); *H04L 5/0007* (2013.01); *H04L 5/0044* (2013.01); *H04L 5/0053* (2013.01); *H04L 27/2626* (2013.01); *H04W 16/14* (2013.01); *H04W 72/0413* (2013.01)

(58) Field of Classification Search
CPC .............. H04L 5/0053; H04L 27/2613; H05L 5/0007; H04W 16/14; H04W 72/0413
USPC ........................................................ 370/329
See application file for complete search history.

(56) References Cited

U.S. PATENT DOCUMENTS

| | | | |
|---|---|---|---|
| 10,142,155 B2 | 11/2018 | Al-Imari et al. | |
| 10,218,621 B2 | 2/2019 | Merlin et al. | |
| 2005/0286409 A1* | 12/2005 | Yoon ...................... | H04L 5/023 370/210 |

(Continued)

FOREIGN PATENT DOCUMENTS

| | | |
|---|---|---|
| EP | 3152849 B1 | 8/2018 |
| WO | 2011004948 A1 | 1/2011 |

(Continued)

*Primary Examiner* — Angel T Brockman
(74) *Attorney, Agent, or Firm* — K&L Gates LLP

(57) ABSTRACT

The present disclosure provides an uplink multiple access scheme and technique to enhance the overall spectral efficiency of wireless systems. The scheme and technique exploits an index modulation concept in orthogonal multiple access systems. A first subblock of transmitted data for a user is conventionally modulated, while a second subblock of the data determines the index of the active channel that will be used to communicate the modulated symbol. The scheme and technique enables all available orthogonal resources to be used for an arbitrary number of users as an extra source of information that is used to enhance the overall spectral efficiency in terms of error efficiency and energy efficiency.

20 Claims, 8 Drawing Sheets

(56) References Cited

U.S. PATENT DOCUMENTS

| | | | |
|---|---|---|---|
| 2010/0002800 A1* | 1/2010 | Kim | H04L 5/0037 375/295 |
| 2012/0093090 A1* | 4/2012 | Han | H04L 27/2615 370/328 |
| 2012/0269274 A1* | 10/2012 | Kim | H04N 19/119 375/240.24 |
| 2013/0272258 A1* | 10/2013 | Lee | H04L 5/0055 370/329 |
| 2018/0167934 A1 | 6/2018 | Seo et al. | |
| 2018/0262306 A1 | 9/2018 | Hadani et al. | |
| 2019/0052495 A1 | 2/2019 | Kim et al. | |

FOREIGN PATENT DOCUMENTS

| | | |
|---|---|---|
| WO | 2015197142 A1 | 12/2015 |
| WO | 2017126897 A1 | 7/2017 |

* cited by examiner

SPECTRAL EFFICIENT UPLINK MULTIPLE ACCESS TECHNIQUES USING INDEX MODULATION

The present application claims priority to U.S. Provisional Application No. 62/861,431 filed on Jun. 14, 2019, the disclosure of which is incorporated herein by reference for all purposes.

BACKGROUND

Wireless communications signals can travel over the air via the electromagnetic spectrum. There is, however, a finite about of electromagnetic spectrum that is allocated for certain uses and/or for certain users. For example, wireless phone operators cannot transmit wireless signals over the same frequencies in the same markets at the same time. As an increasing number of people use wireless communication technologies, such as smartphones, there is a greater need to use various portions of the electromagnetic spectrum. Accordingly, there is a need for greater spectral efficiency for wireless communications.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for transmitting a block of data to a base station. The method may include dividing the block of data into a first subblock and a second subblock. The method may also include selecting, based on the second subblock, a selected channel from among a plurality of channels. The method may also include modulating the first subblock onto the selected channel to generate a modulated subblock. The method may also include transmitting the modulated subblock to the base station. Other embodiments of this aspect include corresponding computer systems, apparatuses, and computer programs recorded on one or more computer storage devices, each configured to perform the actions of the method.

Implementations may include one or more of the following features. The method where the selected channel is selected from among the plurality of channels based on contents of the second subblock. The method where the selected channel corresponds to the contents of the second subblock in an index mapping table. The method where the plurality of channels are at least a subset of a wireless communication spectrum. The method where the channels include at least one of (i) frequency subcarriers of the wireless communication spectrum, (ii) time slots within of the wireless communication spectrum, (iii) orthogonal codes of the wireless communication spectrum, and (iv) quasi-orthogonal codes of the wireless communication spectrum The method where the wireless communication spectrum is divided into a plurality of chunks. The method where the plurality of chunks includes a first chunk assigned to a computing device implementing the method and where the plurality of channels correspond to the first chunk. The method where the selected channel includes at least two of the plurality of channels. The method where the first subblock is modulated onto the selected subcarrier according to a modulation protocol with a predetermined modulation order M. The method where the size of the first subblock is $\log_2 M$. The method where M is equal to 1. The method where the data is divided into multiple blocks, and where the method is performed to transmit each of the blocks. The method where the data is divided into blocks based on a quantity of the plurality of channels. The method where the block of data can be transmitted from a computing device implementing the method to the base station without the computing device and the base station exchanging scheduling communications or overhead communications. Implementations of the described techniques may include hardware, a method or process, or computer software on a computer-readable medium.

DETAILED DESCRIPTION

Figure 1:
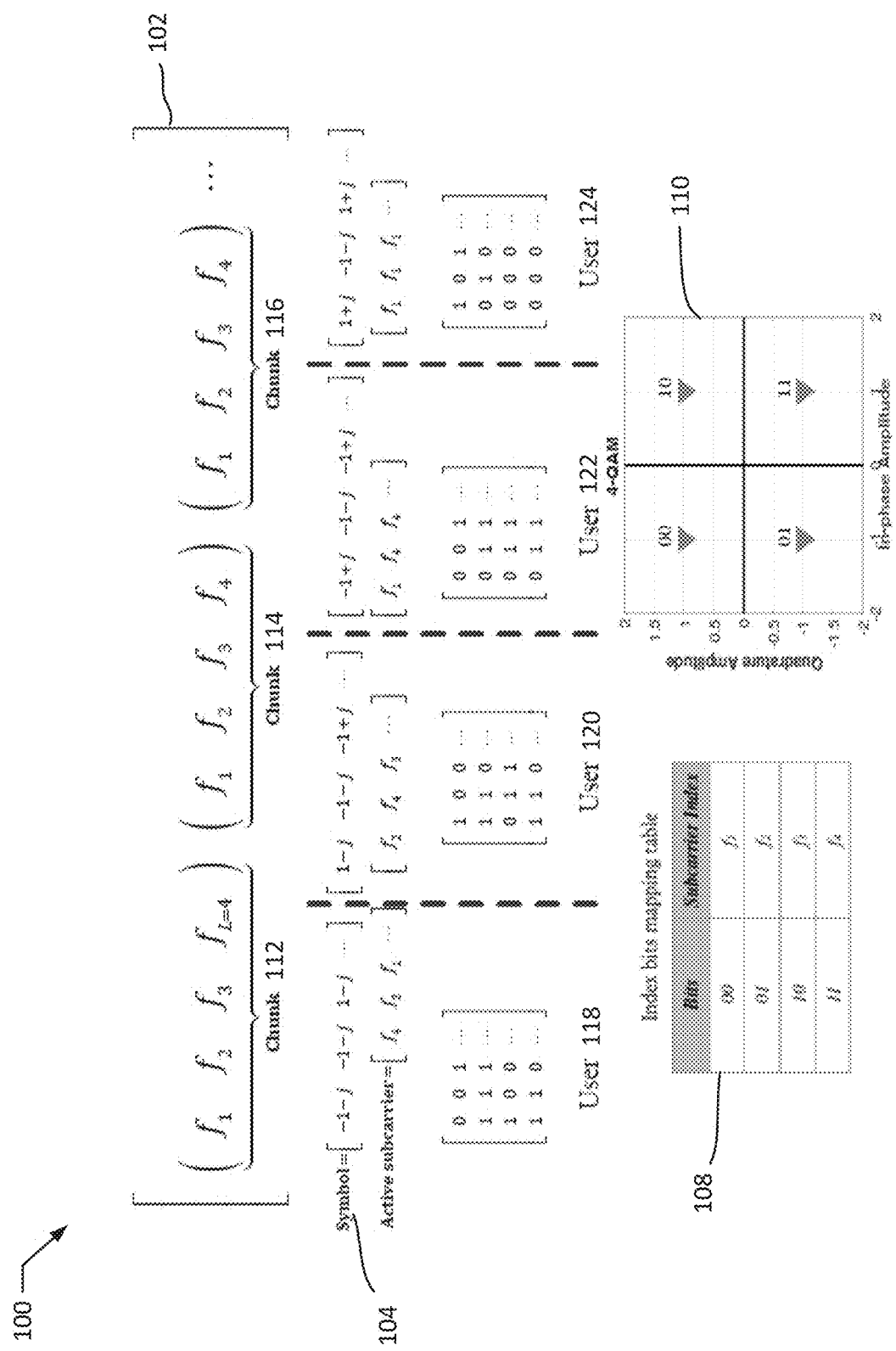
FIG. 1 illustrates a system according to an exemplary embodiment of the present disclosure that is implemented in the frequency domain.

The present disclosure provides methods and systems (e.g., methods and systems utilizing uplink multiple access techniques) that allow users in a wireless communication system to concurrently access available orthogonal resources in a wireless transmission environment. The present techniques allows an arbitrary number of users to access the available resources in a wireless channel and to simultaneously transmit data to a base station. The present techniques may use available resources as an extra constellation diagram, as in an index modulation (IM) system, aiming to increase the overall spectral efficiency. Concurrent transmission from multiple users induces interference that may marginally degrade the overall performance, but the extra source of information from using all available orthogonal resources creates advantages greater than the caused degradation.

In wireless communication systems, users may be assigned orthogonal resources (e.g., orthogonal transmission times, orthogonal transmission frequency, orthogonal transmission codes) to be able to simultaneously communicate with a control unit, generally called a base station. The number of users that can communicate at the same time is, however, limited by the number of available resources. The present disclosure allows for an arbitrary number of users to access a wireless channel such that all available resources are made available for all communicating users. New users are added seamlessly and without any overhead burden. Because all resources are available to all communicating users, some communicating users may use identical resources, which may induce some interference. However, resources are also used as an extra source of information such that the induced interference penalty may typically be much less than the enhancement in the spectral efficiency.

The presently disclosed methods, systems, and techniques may be used with all existing and future wireless communication systems. The methods, systems, and techniques enable all available orthogonal resources to be used for an arbitrary number of users as an extra source of information that may be used to enhance the overall spectral efficiency in terms of error and energy efficiencies. An arbitrary number of users can seamlessly access the available resources and there are no limits to the possible number of communicating users.

The presently disclosed methods, systems, and techniques exploit an index modulation concept in orthogonal multiple access systems. Portions of the bits transmitted by each user are conventionally modulated, while the rest of the bits determine the index of the active subcarrier that will be used to communicate the modulated symbol. The scheme and technique does not require any scheduling algorithm, which would typically result in data collision between users' received messages.

I. Introduction

Spectrum scarcity dictates the need for innovative systems, techniques and algorithms to be enclosed in future wireless communication standards. A main requirement that should be fulfilled by future wireless standards is the ability to accommodate a large number of users with different quality of service requirements, which cannot be achieved without spectral efficiency techniques. Previous wireless communications standards rely mainly on multiple access (MA) techniques to enhance the spectral efficiency.

One technology that promises significant enhancements in overall spectral efficiency is index modulation (IM). IM considers the indexes of the building blocks of the communications system as additional constellation symbols used to convey additional information bits. IM techniques were first used in multi-antenna systems, which lead to the development of space modulation techniques (SMTs) that are shown to significantly improve the error performance and spectral efficiency. Based on the SMTs, IM-orthogonal frequency division multiplexing (IM-OFDM) has been proposed as a viable multicarrier technique with superior performance. Other studies considered IM to enhance the spectral efficiency in cooperative systems, wireless sensor networks and multi-polarization systems. This disclosure provides methods and systems that utilize the IM concept to provide a novel uplink multiple access scheme entitled index modulation based multiple access (IMMA) Existing MA techniques can be categorized as either orthogonal MA (OMA) or non-orthogonal MA (NOMA). In OMA, a user is served by an orthogonal channel that cannot be simultaneously occupied by other users as in time division MA (TDMA) and frequency division MA (FDMA). A main challenge in OMA is that the number of served users cannot exceed the number of available orthogonal channels. A promising solution is foreseen in NOMA techniques, where a number of orthogonal channels can be exploited by a larger number of users. Generally, power domain NOMA (PD-NOMA) and code domain NOMA (CD-NOMA) are considered. In PD-NOMA, users exploit a single channel by transmitting at different power levels according to their distances from the common receiver. Consequently, the receiver applies successive interference cancellation to detect the signals of all users starting from the user with the highest received power. Alternatively, CD-NOMA allows users to occupy fewer channels by using different constellation designs for each user.

Several studies report that NOMA schemes were able to enhance the performance moderately at the cost of excessive overhead in either power control or constellation design algorithms. Most existing studies on NOMA schemes focus on downlink communication, while very few studies addressed NOMA algorithms for uplink transmission. For example, previous studies have proposed a scheduling policy to distribute the served users over the available spectrum resources. As another example, previous studies have proposed an upper limit on the number of served users by a specific number of subcarriers to avoid impracticable increase in complexity and degradation in bit error rate (BER) performance. Certain such studies, unlike other uplink NOMA techniques, employ multi-user detection at the receiver using the optimal maximum likelihood algorithm. In a further example, a precoding transmission is used to decompose the multi-antenna system into several orthogonal channels that can serve the active users within the system. The system cannot be implemented for single antenna users because signal alignment dictates the availability of multi-antennas at the users' side.

The present disclosure describes unique IMMA techniques. IMMA can be implemented on the different types or domains of orthogonal channels. For example, IMMA may be used in the frequency domain, the time domain, and/or the code domain. The implementation of IMMA in the frequency domain can be termed as index modulation orthogonal frequency division multiple access (IM-OFDMA). In IM-OFDMA, the OFDMA symbol may be partitioned into chunks containing certain number of subcarriers. Each chunk may be dedicated to serve a subset of users. An arbitrary number of users, not necessarily equal to the number of available subcarriers, can simultaneously access all accessible resources of the chunk. Within the chunk, each user may transmit modulated symbols on one or more of the available subcarriers and the index of active subcarriers may be utilized as an extra source of information to convey additional data bits. This process may be performed by each user (or a computing device associated with each user) without requiring any prior scheduling or other overhead communications. Sharing a single subcarrier or more by active users may lead to collision between transmissions, which may degrade BER performance. The resultant collision probability may be derived as a function of the available number of users, number of subcarriers per chunk and number of active subcarriers within a chunk. Despite the induced collision, the proposed IM-OFDMA system may achieve significant performance enhancements as compared to its counterpart OFDMA and NOMA schemes while achieving similar spectral efficiency per user. In addition, IM-OFDMA may allow for more users to access the available resources without considerable degradation in performance. The BER performance of IM-OFDMA system is derived analytically assuming an independent and identically distributed flat fading frequency response channel between each subcarrier and the base station (BS) and a closed-form expression is obtained highlighting the impact of different system and channel parameters.

II. IM-OFDMA System Model

The examples discussed in the present disclosure depict and describe IM-OFDMA implementations of the above-described IMMA techniques. In particular, the following discussions focus on IMMA techniques that utilize orthogonal frequency-domain channels. In light of these disclosures, one skilled in the art may understand that other types of orthogonal channels may be used. For example, additional or alternative implementations of the IMMA techniques may utilize time domain channels, code domain channels, and the like. All such implementations are considered within the scope of the present disclosure.

FIG. 1 illustrates a system 100 utilizing IM-OFDMA transmission techniques according to an exemplary embodiment of the present disclosure. In the system 100, the total bandwidth 102 ($B_T$) is partitioned into $L_T$ orthogonal subcarriers (e.g., channels), where the subcarrier bandwidth is $$B_c = \frac{B_T}{L_T}.$$

Each L adjacent subcarriers may form a chunk 112, 114, 116, such that the number of chunks 112, 114, 116 is $$\frac{L_T}{L}.$$

Each chunk may be dedicated to serve N users 118, 120, 122, 124. Thus, the total number of served users 118, 120, 122, 124 may be given as $$N_T = \frac{NL_T}{L}$$

users. Within a chunk 112, 114, 116, the channel between the $n^{th}$, $\forall$ n=1, 2, . . . , N, user 118, 120, 122, 124 and the BS over the $\ell^{th}$ subcarrier is denoted by $$h_{\ell_n},$$

$\forall$ $\ell$=1, 2, . . . , L which is modeled by Rayleigh flat fading channel with zero mean and unit variance, i.e.

$$h_{\ell_n}$$

~ $\mathcal{CN}$ (0,1).

The transmitted data of each user 118, 120, 122, 124 may be partitioned into blocks where the block length, denoted by $\eta_u$, is given as:

$$\eta_u = \left\lfloor \log_2 \binom{L}{L_a} \right\rfloor + \log_2(M) \text{ bits,} \quad (1)$$

with M denoting the modulation order adopted by the user, $\lfloor \cdot \rfloor$ is the floor operator, and $L_a$ is the number of active subcarriers per chunk 112, 114, 116 for each user 118, 120, 122, 124. Without loss of generality and for the sake of clarity, the discussed examples assume that all users 118, 120, 122, 124 adopt the same modulation type and order. However, it should be understood that alternative implementations may utilize different orders and/or modulation types for different users 118, 120, 122, 124. Each transmitted block of a user 118, 120, 122, 124 may be further divided into two subblocks. The first subblock may contain $\log_2$ M bits that passes through the modulator to obtain the complex modulated symbols 104 (s). The second subblock with $$\left\lfloor \log_2 \binom{L}{L_a} \right\rfloor$$

bits determines the index of a combination of $L_a$ subcarriers within the chunk that will be activated to transmit the modulated symbol, s, and all other subcarriers may be off (or unavailable) for the corresponding user 118, 120, 122, 124. All users 118, 120, 122, 124 will individually perform the same process to transmit their own transmitted bit blocks. In the example depicted in FIG. 1, L=N=M=4 and $L_a$=1. The first two bits for each user 118, 120, 122, 124 modulate a complex symbol drawn from a 4-QAM constellation diagram 110; whereas the last 2 bits determine the index of the active subcarrier according to the index mapping table 108. The active subcarrier for each user 118, 120, 122, 124 may be used to transmit the modulated symbol for each user 118, 120, 122, 124 in the corresponding chunk 112, 114, 116.

The transmitted signal over the L subcarriers by the $n^{th}$ user can be expressed by the L-dimensional transmission vector $x_n$, whose entries are all zeros except $L_a$ elements set to $s_n$ at the indexes of the active subcarriers. It is assumed that the total transmitted power is normalized to unity and equally distributed among the active $L_a$ subcarriers. Accordingly, the transmitted matrix from all users, denoted by X, is given as $$X=[x_1;x_2;\ldots;x_N]. \quad (2)$$

The L-dimensional received signal vector is given by $$y=\text{diag}(HX)+w, \quad (3)$$

where diag($\cdot$) denotes the vector containing the elements in diagonal of the corresponding matrix, H is an L×N matrix that includes the channel coefficients of the N users over the L subcarriers, which may be considered independent and identically distributed complex Gaussian random variables, and w=[$w_1$ $w_2$ . . . $w_L$] denotes the L-dimensional additive white Gaussian noise vector with zero mean and $2\sigma^2$ variance, $w_i$~$\mathcal{CN}$ (0, $2\sigma^2$).

At the receiver, the BS may apply a optimum maximum likelihood (ML) detector to jointly decode the transmitted blocks of all users as $$\hat{X} = \underset{X_i \in \mathcal{X}}{\text{argmin}} \ \|y - \text{diag}(HX_i)\|_F^2, \quad (4)$$

$$\forall i = 1, 2, \ldots, (\eta_t = 2^{N\eta_u}),$$

where $\mathcal{X}$ denotes the set of all possible matrices of $X_i$ with $\eta_t = 2^{N\eta_u}$ dimension.

A special case of the proposed IM-OFDMA system can be configured by setting M=1, which indicates that information bits are solely conveyed through IM symbols. In this case, the block length is only $\log_2 L$ bits from each user and a fixed signal (set to unity) is transmitted over the active subcarriers. This special case is called subcarrier-index multiple access (SIMA) scheme.

III. Performance Analysis

Collision Probability

As discussed earlier, incoming transmissions from different users may utilize the same subcarrier indexes for communication, which can induce collision. The collision probability, assuming the probability of activating a certain subcarrier within a chunk is identical for all subcarriers, is expressed as $$Pr(N_a \geq 2) = \sum_{i=2}^{N} \binom{N}{i} \rho^i (1-\rho)^{N-i}, \quad (5)$$

with $N_a$ being the number of users that occupy the corresponding subcarrier and $\rho$ denotes the probability that a user occupies a specific subcarrier.

The probability $\rho$ depends mainly on two values: $L$ and $L_a$. If $$\binom{L}{L_a}$$

is a power of two (e.g., 2, 4, 8), all possible subcarrier combinations will be used and the probability $\rho$ is expressed as $$\rho = \frac{L_a}{L}. \quad (6)$$

However, if $$\binom{L}{L_a}$$

is not a power of two, some subcarrier combinations will be excluded. In this case the value of $\rho$ will differ slightly depending on which combinations have been excluded. When $$\binom{L}{L_a}$$

is a power of two, the collision probability can be rewritten as $$Pr(N_a \geq 2) = \sum_{i=2}^{N} \binom{N}{i} \left(\frac{L_a}{L}\right)^i \left(1-\frac{L_a}{L}\right)^{N-i} \quad (7)$$

which can be further simplified to $$Pr(N_a \geq 2) = 1 - \left(1 - \frac{L_a}{L}\right)^N \left(1 + \frac{NL_a}{L - L_a}\right) \quad (8)$$

Accordingly, the collision probability is affected by N, L and $L_a$. For a fixed L, increasing either $L_a$ or N increases the collision probability and degrades the performance. However, for a fixed N and $L_a$, increasing the value of L reduces the collision probability, which should enhance the BER performance.

Computational Complexity

The receiver computational complexity may be calculated by computing the number of real multiplications needed to evaluate (4), which is expressed as $$\text{IM-OFDMA-ML Complexity} = 2^{N\eta_u}(c_1 + c_2), \quad (9)$$

where $c_1$ denotes the number of multiplications needed to compute diag(HX), $c_2$ denotes the number of multiplications needed to compute the squared norm of a vector of L elements, and $2^{N\eta_u}$ is the number of candidate transmission matrices with $\eta_u$ as given in (1).

As both H and X include complex entries, the multiplication of two complex elements requires 4 real multiplications to be performed. The size of H is L×N and the size of X is L×N. Hence, their multiplication needs $4NL^2$ real multiplications. However, as (4) only concerns the diagonal of the resultant matrix, which is a vector of L elements, the number of required real multiplications for diag(HX) may be reduced to 4NL. As for $c_2$, the squared norm of a vector of L elements necessitates 2L real multiplications. Accordingly, the computational complexity of the ML detector is $$\text{IM-OFDMA-ML Complexity} = 2^{N\eta_u}(4NL+2L). \quad (10)$$

BER Performance

The average BER can be expressed through the well-known union bounding technique as $$BER = \frac{1}{2^{\eta_t}} \sum_{p=1}^{2^{\eta_t}} \sum_{q=1}^{2^{\eta_t}} \frac{1}{\eta_t} \tau_{pq} \overline{PEP}_{pq} \quad (11)$$

where $\tau_{pq}$ denotes the hamming distance between the corresponding bit blocks of the transmission matrices $X_p$ and $X_q$ and $\overline{PEP}_{pq}$ is the average pairwise error probability if $X_p$ is detected given that $X_q$ is actually transmitted.

From (4), the conditional PEP on H can be expressed with the aid of the Q-function as $$PEP_{pq} = Q\left(\sqrt{\frac{\zeta}{2\sigma^2}}\right), \quad (12)$$

where $\zeta = \|H\Lambda\|_F^2$ and $\Lambda = X_p - X_q$. Thus, $\zeta = \Sigma_{\ell=1}^{L} \|\Sigma_{n=1}^{N} h_{\ell n}\Lambda_{n\ell}\|^2$ with $\Lambda_{n\ell}$ being the element in the $n^{th}$ row and the $\ell^{th}$ column in $\Lambda$.

Now, consider that, out of the L values, there are S≤L nonzero values. Discernibly, S values are exponential random variables (RVs) with the mean of the $\ell^{th}$ RV being $\mu_\ell = \sum_{n=1}^{N} \|\Lambda_{n\ell}\|^2$. Out of the S means, there should be R≤S distinctive means denoted by $\mu_1, \mu_2 \ldots \mu_R$. Let the number of exponential RVs that have similar mean, $\mu_r$; 1≤r≤R, be $m_r$, which implies that $m_1+m_2+\ldots+m_R=S$. Accordingly, the probability distribution function of $\zeta$ can be expressed as $$f_\zeta(\zeta) = \sum_{r=1}^{R} \lambda_r^{m_r} e^{-\zeta\lambda_r} \sum_{w=1}^{m_r} A \frac{(-1)^{m_r-w}}{(w-1)!} \zeta^{w-1}, \quad (13)$$

where $$\lambda_x = \frac{1}{\mu_x}$$

denotes the rate of the $x^{th}$ exponential RV and $$A = \sum_{\substack{b_1+\cdots+b_R=m_r-w \\ b_r=0}} \prod_{\substack{t=1 \\ t\neq r}}^{R} \binom{m_t+b_t-1}{b_t} \frac{\lambda_t^{m_t}}{(\lambda_t-\lambda_r)^{m_t+b_t}}$$

Now, $\overline{PEP}_{pq}$ can be computed by integrating (12) over $f_\zeta(\zeta)$ as $$\overline{PEP}_{pq} = \int_0^\infty Q\left(\sqrt{\frac{\zeta}{2\sigma^2}}\right) \sum_{r=1}^{R} \lambda_r^{m_r} e^{-\zeta\lambda_r} \sum_{w=1}^{m_r} A \frac{(-1)^{m_r-w}}{(w-1)!} \zeta^{W-1} \cdot d\zeta \quad (14)$$

Using Craig's formula of the Q-function, (14) can be rewritten as $$\overline{PEP}_{pq} = \frac{1}{\pi} \int_0^{\pi/2} \sum_{r=1}^{R} \lambda_r^{m_r} \sum_{w=1}^{m_r} A \frac{(-1)^{m_r-w}}{(w-1)!} \times \quad (15)$$
$$\left[\int_0^\infty \exp\left(-\frac{\zeta}{4\sigma^2\sin^2\theta}\right) e^{-\zeta\lambda_r} \zeta^{w-1} \cdot d\zeta\right] d\theta.$$

The integral over $\zeta$ can be further solved to yield $$\overline{PEP}_{pq} = \frac{1}{\pi} \int_0^{\pi/2} \sum_{r=1}^{R} \sum_{w=1}^{m_r} A(-\lambda_r)^{m_r-w} \left(\frac{\sin^2\theta}{\beta_r+\sin^2\theta}\right)^w d\theta, \quad (16)$$

where $$\beta_r = \frac{1}{4\sigma^2\lambda_r}.$$

Swapping the summations and the integral, (16) can be rewritten as $$\overline{PEP}_{pq} = \sum_{r=1}^{R} \sum_{w=1}^{m_r} A(-\lambda_r)^{m_r-w} \frac{1}{\pi} \int_0^{\pi/2} \left(\frac{\sin^2\theta}{\beta_r+\sin^2\theta}\right)^w d\theta, \quad (17)$$

which can be solved to give $$\overline{PEP}_{pq} = \sum_{r=1}^{R} \sum_{w=1}^{m_r} A(-\lambda_r)^{m_r-w} \chi^w \times \sum_{k=0}^{w-1} \binom{w-1+k}{k}(1-\chi)^k, \quad (18)$$

with $$\chi = \frac{1}{2}\left(1-\sqrt{\frac{\beta_r}{1+\beta_r}}\right).$$

Finally, the average BER can be calculated by substituting (18) into (11).

IV. Analytical and Simulation Results

The analytical and simulation results presented in this section affirm the superiority of the proposed IM-OFDMA over conventional OFDMA and NOMA systems in terms of spectral efficiency and average BER. In all depicted results, the BER performance is evaluated through Monte Carlo simulations and corroborated through the above-derived analytical formulas. The average SNR per user is defined as the ratio of the transmit power of a user, which is assumed to be normalized to unity, over the noise power at the receiver input for each subcarrier as $$SNR = \frac{1}{2\sigma^2}.$$

Figure 2:
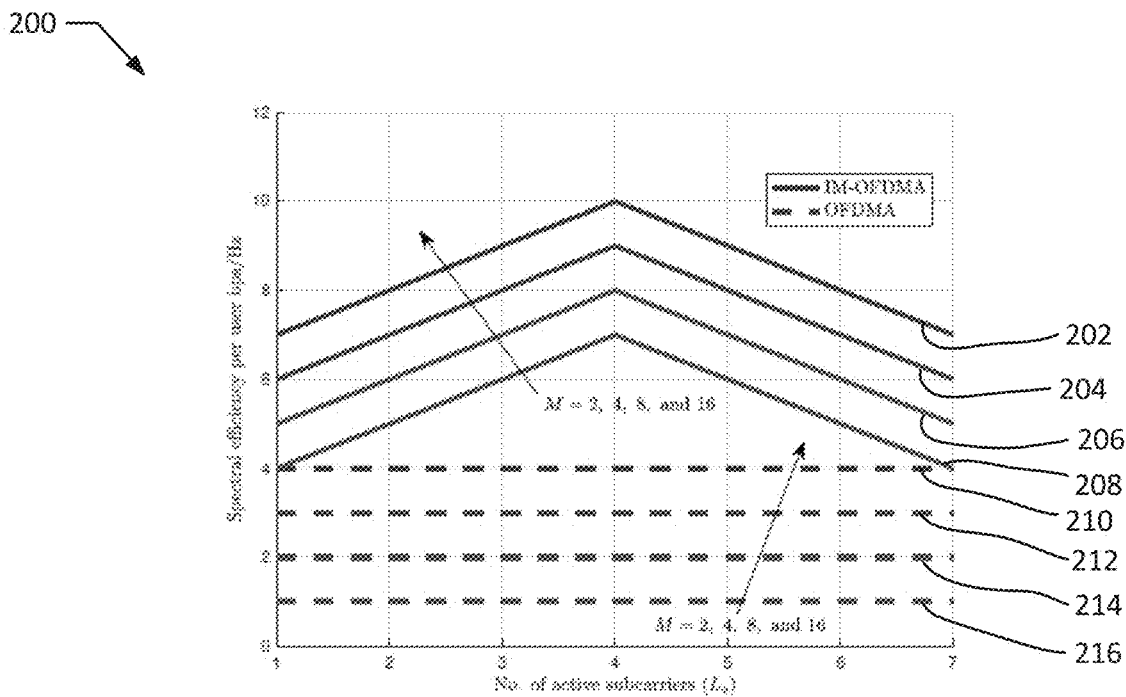
FIG. 2 illustrates a plot of achievable spectral efficiency according to an exemplary embodiment of the present disclosure that is implemented in the frequency domain.

FIG. 2 illustrates a plot 200 of the achievable spectral efficiency according to an exemplary embodiment of the present disclosure. The plot 200 depicts the achievable spectrum efficiency of IM-OFDMA and OFDMA systems as a function of the number of active subcarriers per user, $L_a$. In particular, lines 202, 204, 206, 208 correspond to an exemplary IM-OFDMA system and lines 210, 212, 214, 216 correspond to an OFDMA system. In the depicted example, the chunk size is L=8, the number of users is N=8, and different modulation orders M=2, 4, 8 and 16 are considered. In particular, lines 216, 208 correspond to M=2, lines 214, 206 correspond to M=4, lines 212, 204 correspond to M=6, and lines 210, 202 correspond to M=8. The spectral efficiency of OFDMA is shown to be independent of $L_a$, where $L_a$ is fixed to $\log_2$ M bps/Hz per user. Yet, the spectral efficiency of the M-OFDMA can be enhanced by optimizing the number of active subcarriers per user and depends on the considered system parameters. However, as can be seen in the plot 200, the spectral efficiency of the IM-OFDMA is always higher than the spectral efficiency of the OFDMA system, where at the optimal value of $L_a$, IM-OFDMA achieves 6 bits more per user as compared to OFDMA at the same modulation order.

Figure 3:
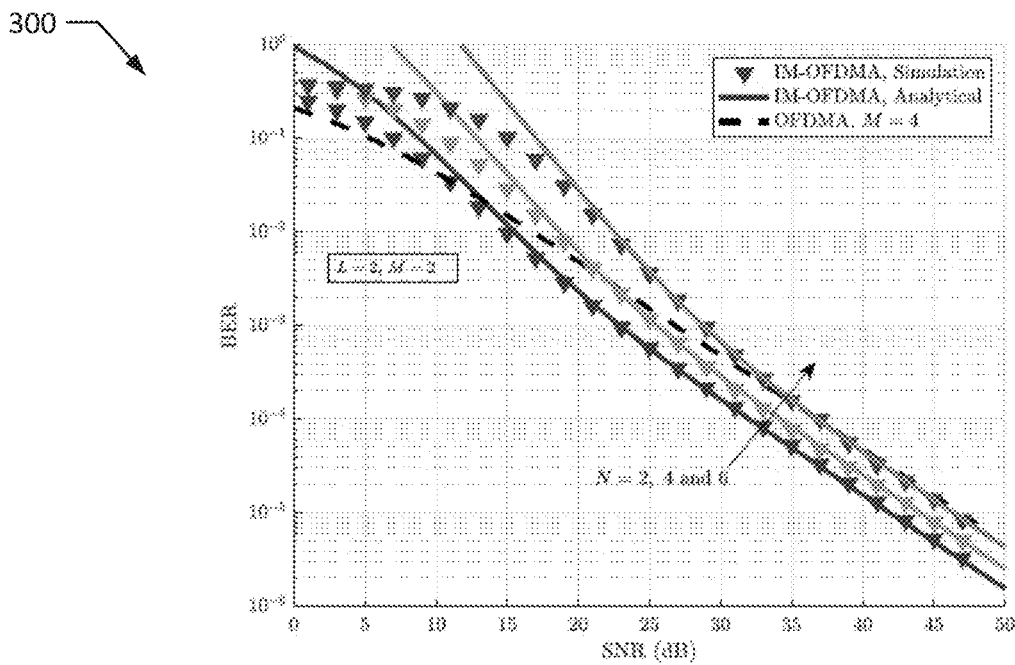
FIG. 3 illustrates a plot comparing the average BER performance of an exemplary embodiment of the present disclosure that is implemented in the frequency domain.

FIG. 3 illustrates a plot 300 that compares the average BER performance of IM-OFDMA and conventional OFDMA systems according to an exemplary embodiment of the present disclosure. The plot 300 depicts the average BER performance assuming a spectral efficiency of 2 bps/Hz per user. For IM-OFDMA, a chunk size of L=2 and BPSK (M=2) modulation order is assumed to be deployed by each user. However, conventional OFDMA system with L=2 can serve only two users and QPSK (M=4) modulation is considered to attain the 2 bps/Hz spectral efficiency. The results depicted in the plot 300 reveal significant enhancements where a substantial gain in SNR can be seen for the IM-OFDMA system over the OFDMA system. For instance, at $10^{-4}$ BER, the IM-OFDMA system outperforms the OFDMA system by nearly 5 dB. Analytical results are also depicted for the IM-OFDMA system, which closely match the simulated results over a wide range of pragmatic SNR values.

The plot 300 also depicts the BER performance of an IM-OFDMA system for an increasing number of users, which may be added with no additional increase in the related overhead communications required for user scheduling processes. In particular, results for N=4 and 6 are illustrated. As can be seen in the plot 300, increasing the number of users slightly degrades the performance, but moving from 2 users to 6 users degrades the performance by less 5 dB. In fact, the results depicted in the plot 300 demonstrate that an IM-OFDMA system with 6 users performs nearly the same as an OFDMA system with 2 users at pragmatic SNR values.

Figure 4:
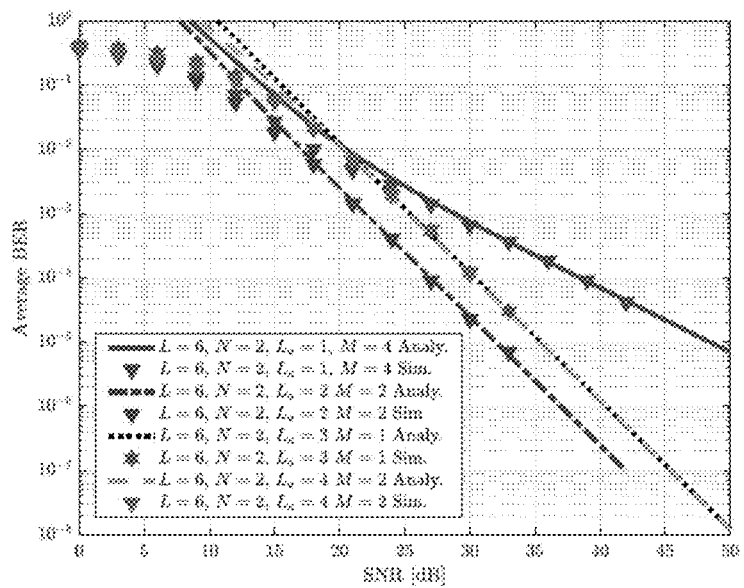
FIGS. 4 and 5 illustrate plots comparing the effects of increasing the number of available subcarriers according to exemplary embodiments of the present disclosure that are implemented in the frequency domain.
Figure 5:
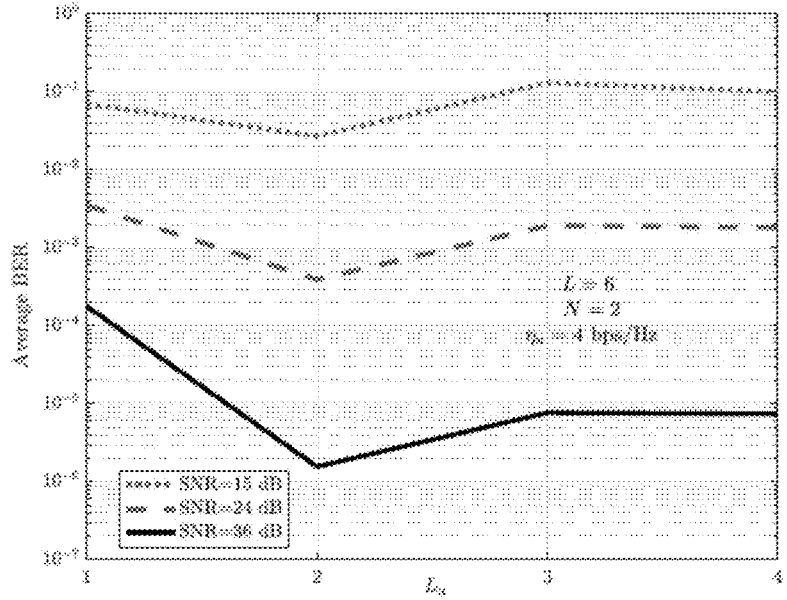

FIGS. 4 and 5 illustrate plots 400, 500 indicating the effects of increasing the number of available subcarriers. In particular, the plots 400, 500 illustrate the impact of increasing the value of $L_a$ while achieving a target spectral efficiency per user. Specifically, the plot 400 depicts the average BER for an exemplary IM-OFDMA system with L=6, N=2 and different values of $L_a$ ($L_a$=1, 2, 3, 4) while achieving 4 bps/Hz spectral efficiency per user. To maintain the same spectral efficiency of 4 bps/Hz, the modulation order may be respectively adapted to M=4, 2, 1, and 2 for the values of $L_a$=1, 2, 3, and 4. The plot 500 further illustrates the impact of varying at fixed SNR values. As can be seen in the plots 400, 500, the value of $L_a$ should be optimized for optimum BER performance and for each system configuration.

Figure 6:
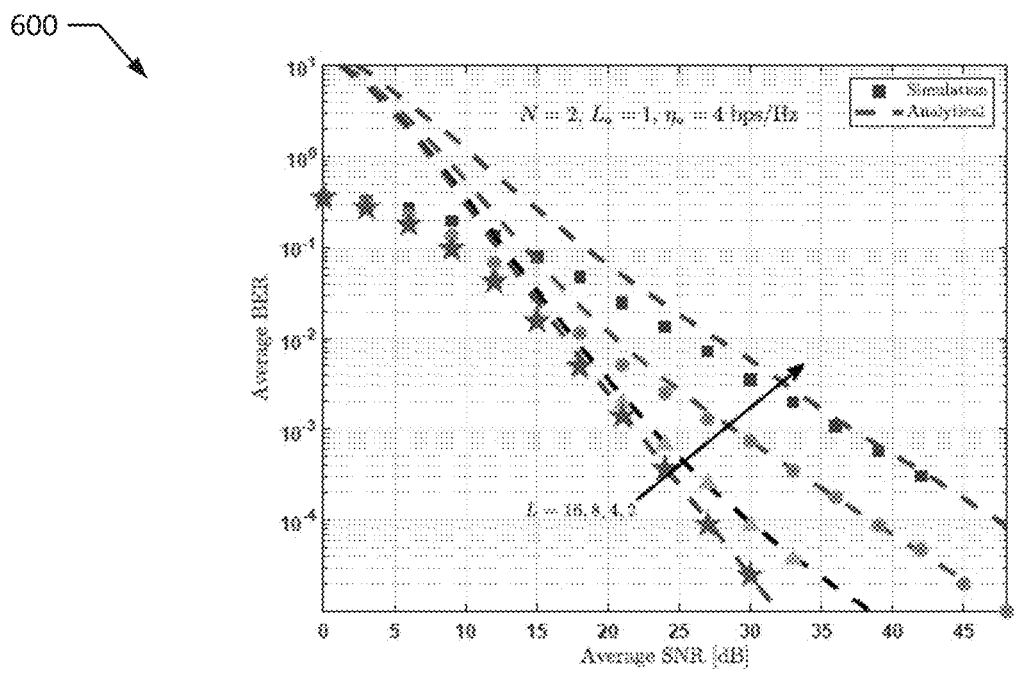
FIG. 6 illustrates a plot that varies the chunk size for a fixed spectral efficiency according to an exemplary embodiment of the present disclosure that is implemented in the frequency domain.

FIG. 6 illustrates a plot 600 that varies the chunk size L for a fixed spectral efficiency according to an exemplary embodiment of the present disclosure. Specifically, the average BER of an exemplary IM-OFDMA system is plotted against the average SNR for 2 users using different chunk sizes L=2, 4, 8, and 16 while achieving 4 bps/Hz spectral efficiency per user. In the depicted examples, the number of active subcarriers per user is fixed to $L_a$=1, and the modulation order is tuned to achieve the same spectral efficiency per user for each chunk size (M=8, 4, 2, and 1 for L=2, 4, 8, and 16, respectively). As can be seen in the plot 600, increasing the chunk size improves the average BER. In particular, for the case of L=16, the SNR gain at $10^{-4}$ BER is about 3 dB, 12 dB, and 22 dB when compared to the cases of L=8, 4, and 2, respectively. Such improvements may result from reducing the probability of data collision among the active users as chunk size increases. This should accordingly enhance the average BER performance.

Figure 7:
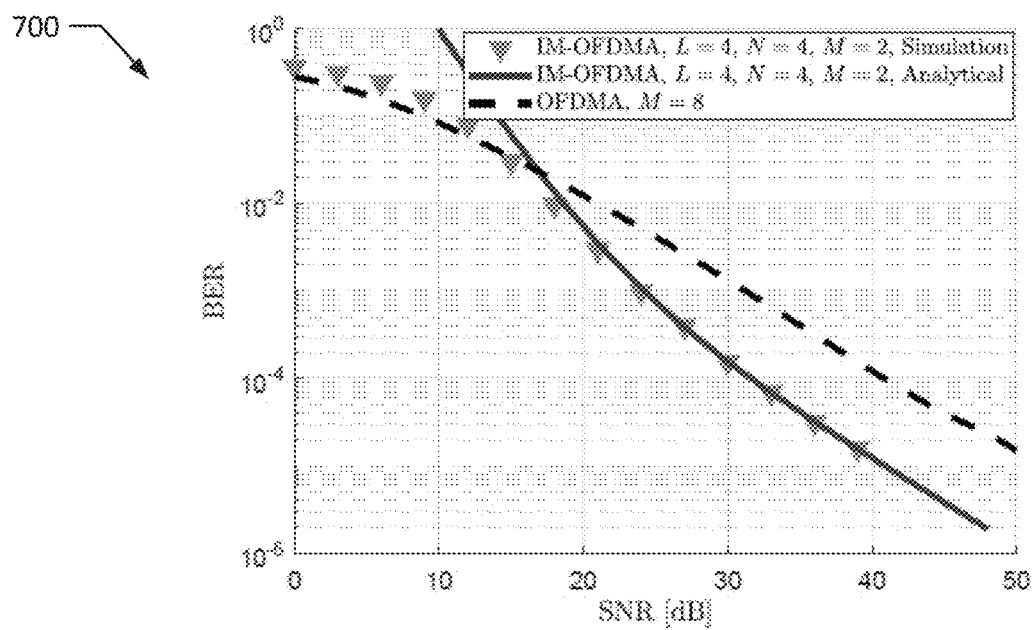
FIGS. 7-11 illustrates plots comparing results for exemplary embodiments of the present disclosure that are implemented in the frequency domain.

FIG. 7 illustrates a plot 700 comparing results for an IM-OFDMA system and an OFDMA system according to an exemplary embodiment of the present disclosure. In particular, the plot 700 illustrates the BER versus the SNR assuming a chunk size of N=L=4. For the IM-OFDMA system, BPSK (M=2) modulation is assumed, whereas 8-PSK (M=8) modulation is assumed for the OFDMA system. Again, derived analytical formulas are shown to closely match simulation results over wide range of SNR values. Also, the IM-OFDMA system outperforms the OFDMA system in the plot 700 by almost 9 dB at a BER of $10^{-4}$.

Figure 8:
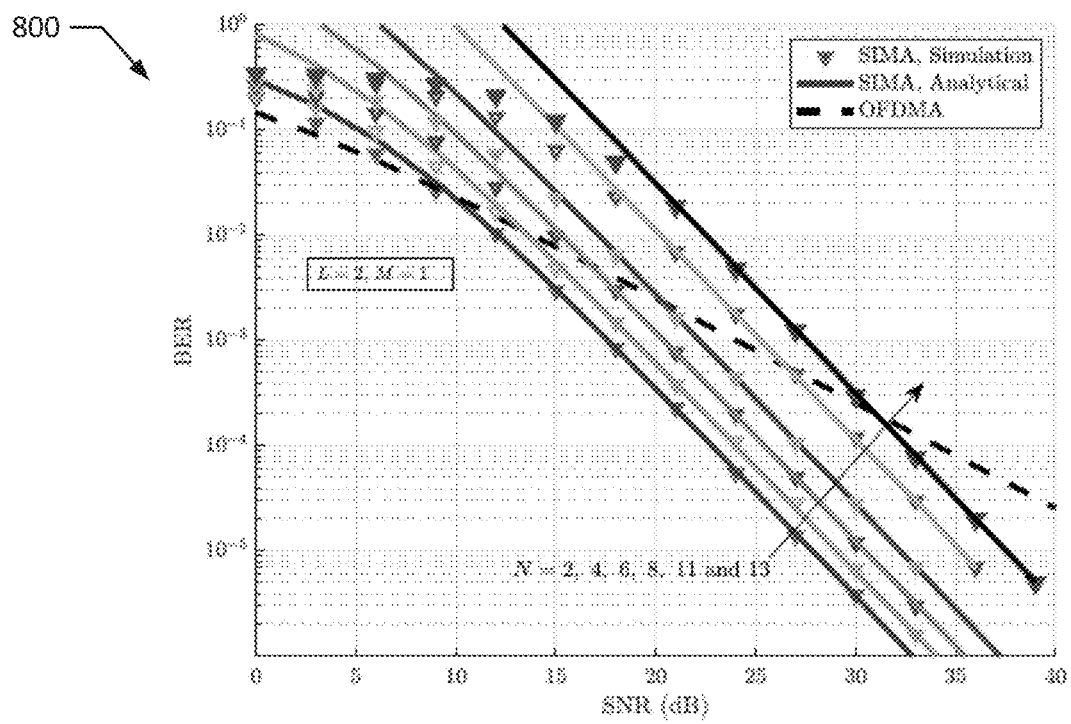
Figure 9:
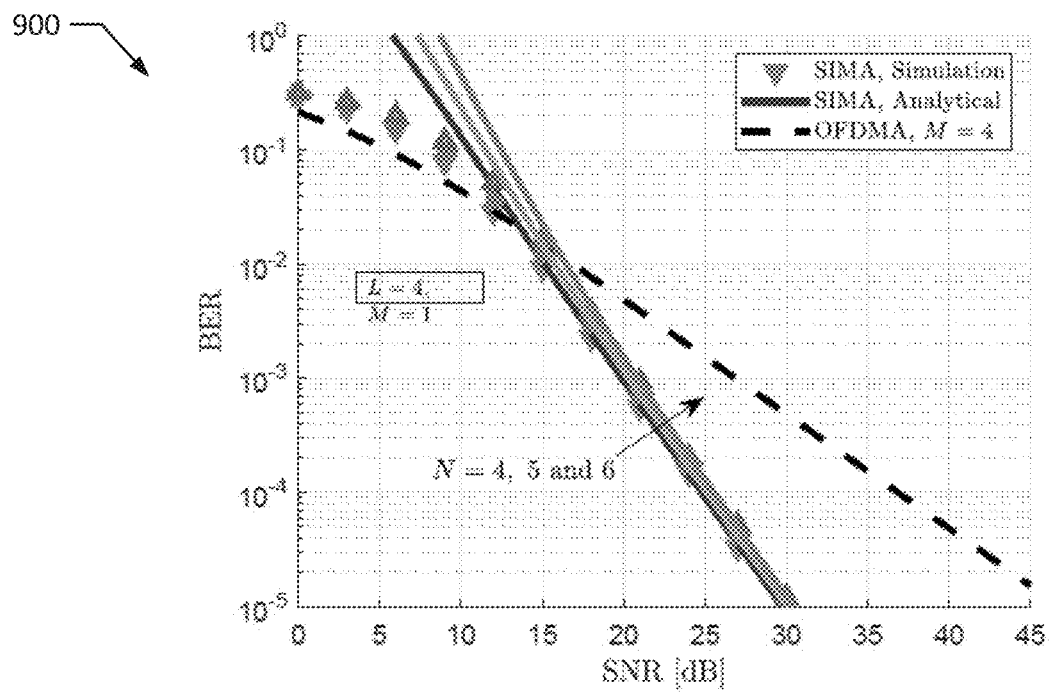

FIGS. 8 and 9 illustrate plots 800, 900 of results for a SIMA system according to exemplary embodiments of the present disclosure. The plot 800 compares the performance of SIMA and OFDMA systems at a spectral efficiency of 1 bps/Hz per user, which is achieved using L=2 for the SIMA system and BPSK modulation for the OFDMA system. In particular, the plot 800 depicts the change to the performance of the SIMA system as the number of users increases from 2 to 13. Specifically, values of N=2, 4, 6, 8, 11 and 13 are depicted on the plot 800. Analytical results are also depicted and shown to closely match simulation results for the various values of N. With 2 users, the SIMA system outperforms the OFDMA system by almost 12 dB at a BER of $10^{-4}$. In addition, with 13 users, performance of the SIMA system degrades by about 9 dB, but still outperforms OFDMA system, which cannot serve more than 2 users.

The plot 900 compares performance of a SIMA system and an OFDMA system with a spectral efficiency of 2 bps/Hz per user, a chunk size of L=4 and M=4 (QPSK) modulation. Again, different number of users are depicted, with values of N=4, 5, and 6. With 4 users, the SIMA system outperforms the OFDMA system by about 12 dB. With 6 users, performance of the SIMA system degrades by no more than 1 dB.

Figure 10:
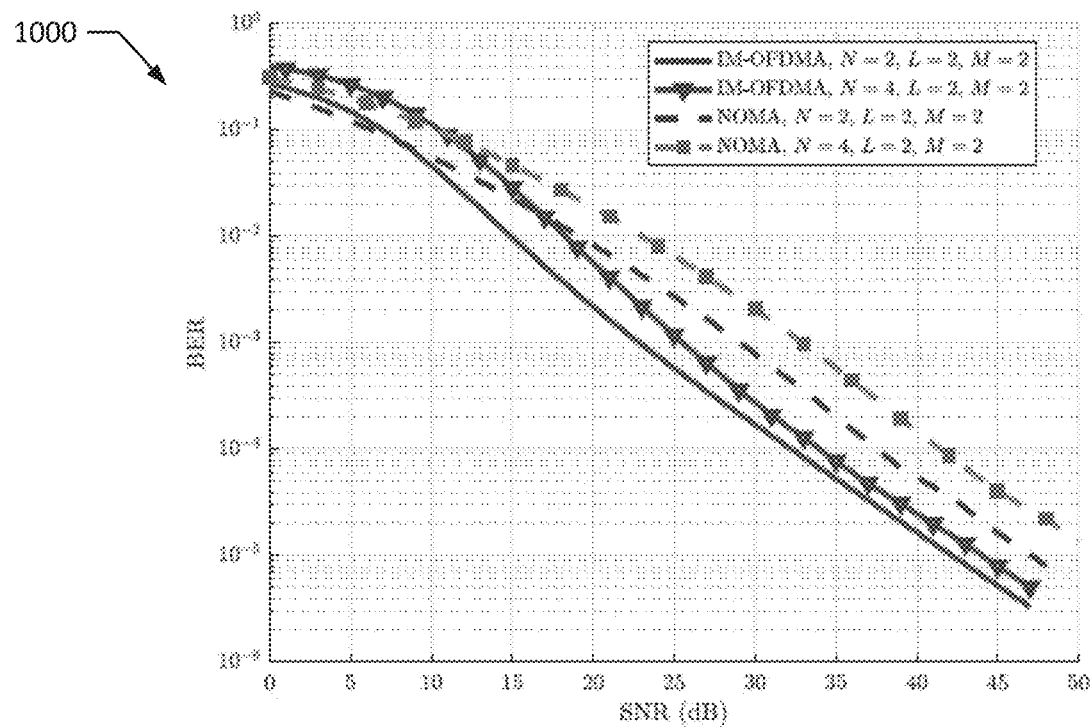
Figure 11:
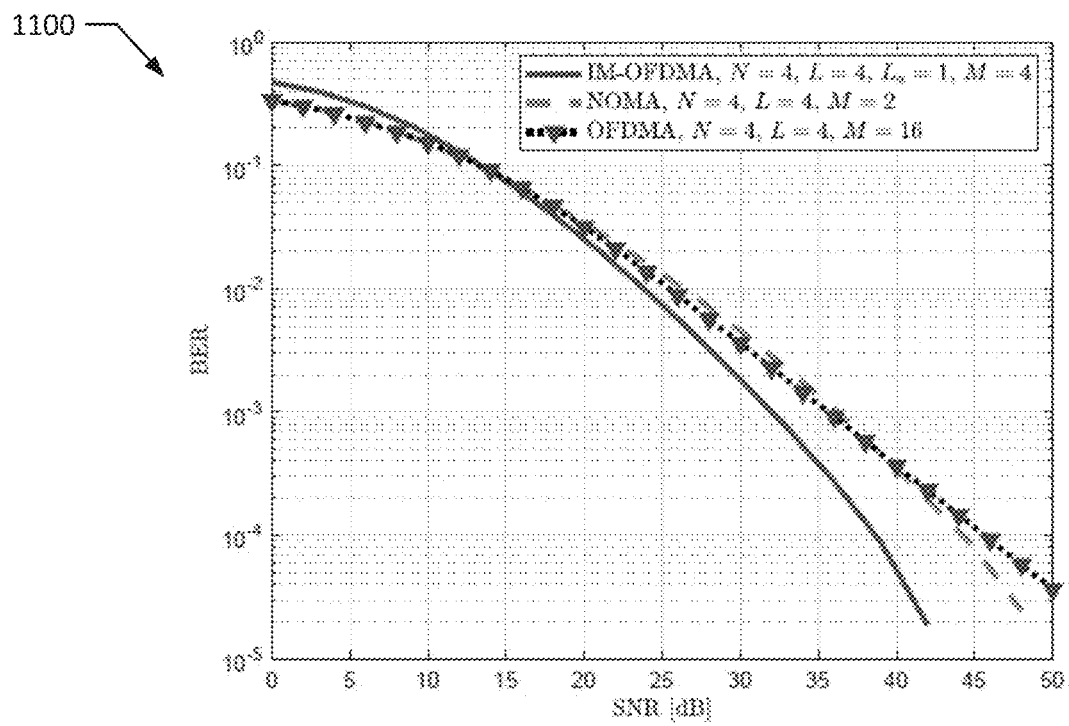

FIGS. 10 and 11 illustrate plots 1000, 1100 comparing the performance for an IM-OFDMA system and an NOMA system according to exemplary embodiments of the present disclosure. In particular, the plots 1000, 1100 depict a BER against an average SNR at 2 bps/Hz and 4 bps/Hz spectral efficiency per user, respectively. In the plot 1000, the results are depicted assuming L=2 and M=2 (BPSK) modulation for N=2 and N=4 users. As can be seen in the plot 1000, the IM-OFDMA system outperforms the NOMA scheme at both values of N. In particular, at $10^{-4}$ BER, the SNR gain is about 6 dB and 8 dB for N=2 and N=4, respectively.

In the plot 1100, the results for the IM-OFDMA system are depicted assuming L=4, $L_a$=1, N=4 and M=4 (QPSK) modulation, while the results for the NOMA system are depicted assuming L=4, N=4 and M=2 (BPSK) modulation, and the results for the conventional OFDMA system are depicted assuming L=4, N=4, and M=16 (PSK) modulation. For the NOMA system, all users are allowed to send BPSK symbol over each subcarrier, while each user in the conventional OFDMA system transmits 16-PSK symbols over a single orthogonal subcarrier. Yet, in the plot 1100, the IM-OFDMA system demonstrates superior performance and outperforms both OFDMA and NOMA schemes, where at $10^{-4}$ BER, the SNR gains for the IM-OFDMA system are about 5 dB and 7 dB as compared to NOMA and OFDMA systems, respectively.

V. Conclusions

As explained above, the present disclosures presents new and inventive multiple access systems and methods based on IM-OFDMA techniques. In particular, available orthogonal subcarriers in OFDMA may be utilized across multiple users as an extra source of information and may allow the users to use all available subcarriers concurrently at the cost of minimal additional interference. Reported results reveal significant enhancements as compared to conventional OFDMA and NOMA systems with potential gains of more than 10 dB in SNR. It is also shown that IM-OFDMA allows for increasing the number of users with only a marginal degradation in BER performance and without any additional overhead communications or scheduling complexity. Performance analysis are conducted and substantiated through Monte Carlo simulation results over wide range of system parameters. In addition, collision probability and computational complexity analysis are provided and discussed.

VI. Exemplary Method

Figure 12:
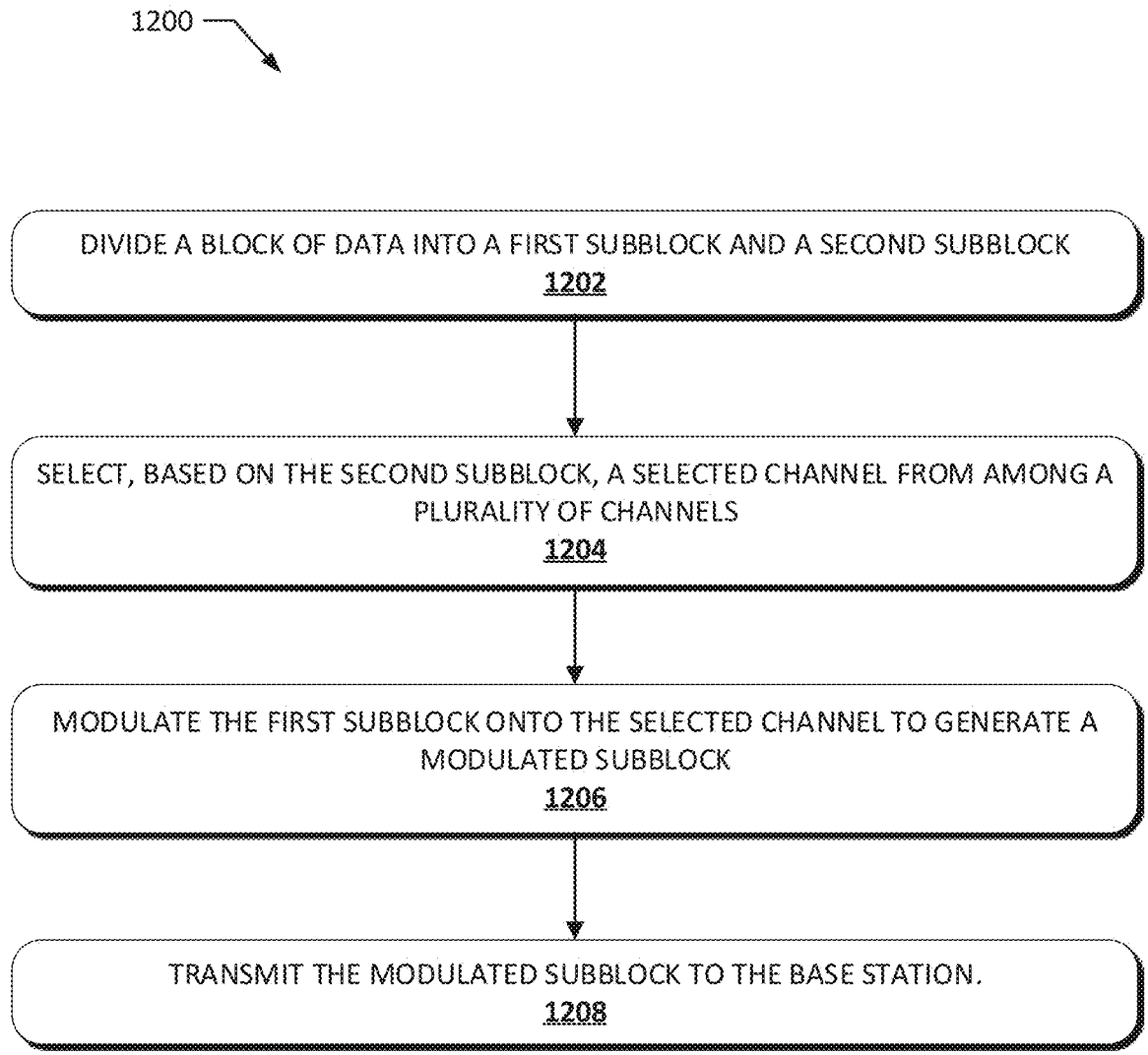
FIG. 12 illustrates a method according to an exemplary embodiment of the present disclosure that is implemented in the frequency domain.

FIG. 12 illustrates a method 1200 according to an exemplary embodiment of the present disclosure. The method 1200 may be performed to data to a base station using IMMA techniques, such as the IM-OFDMA techniques discussed above. In particular, the method 1200 may be performed at least in part by the system 100. The method 1200 may also be implemented by a set of instructions stored on a computer readable medium that, when executed by a processor, cause the computer system to perform the method 1200. For example, all or part of the method 1200 may be implemented by a processor and a memory of a computing system, such as the computer system 1300 discussed below. Although the examples below are described with reference to the flowchart illustrated in FIG. 12, many other methods of performing the acts associated with FIG. 12 may be used. For example, the order of some of the blocks may be changed, certain blocks may be combined with other blocks, one or more of the blocks may be repeated, and some of the blocks described may be optional.

The method 1200 may begin with dividing a block of data into a first subblock and a second subblock (block 1202). For example, data to be transmitted may be dividing into one or more blocks that may be subdivided into subblocks. The size of the first subblock may depend on the modulation order M used to modulate data onto a channel (e.g., a subcarrier), as described above. For example, the size of the first subblock may be $\log_2 M$.

A selected channel may be selected from among a plurality of channels based on the second subblock (block 1204). For example, a wireless communication spectrum including multiple channels may be divided into multiple chunks. One chunk may be assigned to a user or computing device transmitting the data. The channels may include any orthogonal or quasi-orthogonal resources of the wireless communication spectrum. For example, the channels may include frequency subcarriers, time slots, orthogonal codes, quasi-orthogonal codes, and the like. The selected channel may be selected from among the plurality of channels included within the assigned chunk. The selected channel may be selected based on the contents of the second subblock. For example, the selected channel may be selected based on an index mapping table. In certain such instances, the selected channel may be selected as the channel corresponding to the contents of the second subblock within the index mapping table. It should be appreciated that, in certain instances, the selected channel may include two or more channels (e.g., two or more channels from within the assigned chunk.

The first subblock may be modulated onto the selected channel to generate a modulated subblock (block 1206). For example, the first subblock may be modulated onto the selected channel according to a modulation protocol (e.g., BPSK, QPSK, and the like) with a modulation order M. The modulated subblock may then be transmitted to the base station (block 1208).

VII. Exemplary Computer System

Figure 13:
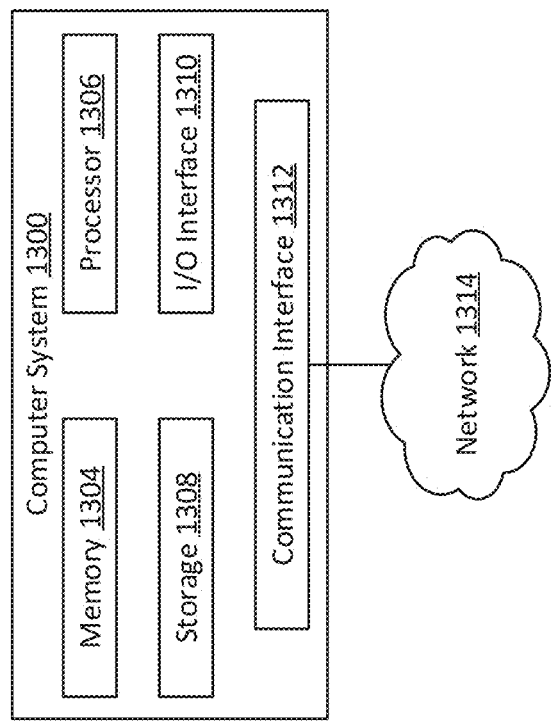
FIG. 13 illustrates a computing system according to an exemplary embodiment of the present disclosure.

FIG. 13 illustrates an example computer system 1300 that may be utilized to implement one or more of the devices and/or components discussed herein, such as the IF-OFDMA transmission techniques and the system 100. In particular embodiments, one or more computer systems 1300 perform one or more steps of one or more methods described or illustrated herein. In particular embodiments, one or more computer systems 1300 provide the functionalities described or illustrated herein. In particular embodiments, software running on one or more computer systems 1300 performs one or more steps of one or more methods described or illustrated herein or provides the functionalities described or illustrated herein. Particular embodiments include one or more portions of one or more computer systems 1300. Herein, a reference to a computer system may encompass a computing device, and vice versa, where appropriate. Moreover, a reference to a computer system may encompass one or more computer systems, where appropriate.

This disclosure contemplates any suitable number of computer systems 1300. This disclosure contemplates the computer system 1300 taking any suitable physical form. As example and not by way of limitation, the computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1306, memory 1304, storage 1308, an input/output (I/O) interface 1310, and a communication interface 1312. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 1306 includes hardware for executing instructions, such as those making up a computer program. As an example and not by way of limitation, to execute instructions, the processor 1306 may retrieve (or fetch) the instructions from an internal register, an internal cache, memory 1304, or storage 1308; decode and execute the instructions; and then write one or more results to an internal register, internal cache, memory 1304, or storage 1308. In particular embodiments, the processor 1306 may include one or more internal caches for data, instructions, or addresses. This disclosure contemplates the processor 1306 including any suitable number of any suitable internal caches, where appropriate. As an example and not by way of limitation, the processor 1306 may include one or more instruction caches, one or more data caches, and one or more translation lookaside buffers (TLBs). Instructions in the instruction caches may be copies of instructions in memory 1304 or storage 1308, and the instruction caches may speed up retrieval of those instructions by the processor 1306. Data in the data caches may be copies of data in memory 1304 or storage 1308 that are to be operated on by computer instructions; the results of previous instructions executed by the processor 1306 that are accessible to subsequent instructions or for writing to memory 1304 or storage 1308; or any other suitable data. The data caches may speed up read or write operations by the processor 1306. The TLBs may speed up virtual-address translation for the processor 1306. In particular embodiments, processor 1306 may include one or more internal registers for data, instructions, or addresses. This disclosure contemplates the processor 1306 including any suitable number of any suitable internal registers, where appropriate. Where appropriate, the processor 1306 may include one or more arithmetic logic units (ALUs), be a multi-core processor, or include one or more processors 1306. Although this disclosure describes and illustrates a particular processor, this disclosure contemplates any suitable processor.

In particular embodiments, the memory 1304 includes main memory for storing instructions for the processor 1306 to execute or data for processor 1306 to operate on. As an example, and not by way of limitation, computer system 1300 may load instructions from storage 1308 or another source (such as another computer system 1300) to the memory 1304. The processor 1306 may then load the instructions from the memory 1304 to an internal register or internal cache. To execute the instructions, the processor 1306 may retrieve the instructions from the internal register or internal cache and decode them. During or after execution of the instructions, the processor 1306 may write one or more results (which may be intermediate or final results) to the internal register or internal cache. The processor 1306 may then write one or more of those results to the memory 1304. In particular embodiments, the processor 1306 executes only instructions in one or more internal registers or internal caches or in memory 1304 (as opposed to storage 1308 or elsewhere) and operates only on data in one or more internal registers or internal caches or in memory 1304 (as opposed to storage 1308 or elsewhere). One or more memory buses (which may each include an address bus and a data bus) may couple the processor 1306 to the memory 1304. The bus may include one or more memory buses, as described in further detail below. In particular embodiments, one or more memory management units (MMUs) reside between the processor 1306 and memory 1304 and facilitate accesses to the memory 1304 requested by the processor 1306. In particular embodiments, the memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory implementations, this disclosure contemplates any suitable memory implementation.

In particular embodiments, the storage 1308 includes mass storage for data or instructions. As an example and not by way of limitation, the storage 1308 may include a hard disk drive (HDD), a floppy disk drive, flash memory, an optical disc, a magneto-optical disc, magnetic tape, or a Universal Serial Bus (USB) drive or a combination of two or more of these. The storage 1308 may include removable or non-removable (or fixed) media, where appropriate. The storage 1308 may be internal or external to computer system 1300, where appropriate. In particular embodiments, the storage 1308 is non-volatile, solid-state memory. In particular embodiments, the storage 1308 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1308 taking any suitable physical form. The storage 1308 may include one or more storage control units facilitating communication between processor 1306 and storage 1308, where appropriate. Where appropriate, the storage 1308 may include one or more storages 1308. Although this disclosure describes and illustrates particular storage, this disclosure contemplates any suitable storage.

In particular embodiments, the I/O Interface 1310 includes hardware, software, or both, providing one or more interfaces for communication between computer system 1300 and one or more I/O devices. The computer system 1300 may include one or more of these I/O devices, where appropriate. One or more of these I/O devices may enable communication between a person (i.e., a user) and computer system 1300. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 1310 may include one or more device or software drivers enabling processor 1306 to drive one or more of these I/O devices. The I/O interface 1310 may include one or more I/O interfaces 1310, where appropriate. Although this disclosure describes and illustrates a particular I/O interface, this disclosure contemplates any suitable I/O interface or combination of I/O interfaces.

In particular embodiments, communication interface 1312 includes hardware, software, or both providing one or more interfaces for communication (such as, for example, packet-based communication) between computer system 1300 and one or more other computer systems 1300 or one or more networks 1314. As an example and not by way of limitation, communication interface 1312 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 1314 and any suitable communication interface 1312 for the network 1314. As an example and not by way of limitation, the network 1314 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 1300 may include any suitable communication interface 1312 for any of these networks, where appropriate. Communication interface 1312 may include one or more communication interfaces 1312, where appropriate. Although this disclosure describes and illustrates a particular communication interface implementations, this disclosure contemplates any suitable communication interface implementation.

The computer system 1302 may also include a bus. The bus may include hardware, software, or both and may communicatively couple the components of the computer system 1300 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for transmitting a block of data to a base station, the method comprising:
dividing the block of data into a first subblock and a second subblock;
selecting, based on the second subblock, a selected channel from among a plurality of channels;
modulating the first subblock onto the selected channel subcarrier to generate a modulated subblock; and
transmitting the modulated subblock to the base station.

2. The method of claim 1, wherein the selected channel is selected from among the plurality of channels based on contents of the second subblock.

3. The method of claim 2, wherein the selected channel corresponds to the contents of the second subblock in an index mapping table.

4. The method of claim 1, wherein the plurality of channels are at least a subset of a wireless communication spectrum.

5. The method of claim 4, wherein the channels include at least one of (i) frequency subcarriers of the wireless communication spectrum, (ii) time slots within of the wireless communication spectrum, (iii) orthogonal codes of the wireless communication spectrum, and (iv) quasi-orthogonal codes of the wireless communication spectrum.

6. The method of claim 4, wherein the wireless communication spectrum is divided into a plurality of chunks.

7. The method of claim 6, wherein the plurality of chunks includes a first chunk assigned to a computing device implementing the method and wherein the plurality of channels correspond to the first chunk.

8. The method of claim 1, wherein the selected channel includes at least two of the plurality of channels.

9. The method of claim 1, wherein the first subblock is modulated onto the selected channel according to a modulation protocol with a predetermined modulation order 1.

10. The method of claim 9, wherein the size of the first subblock is $\log_2$ M.

11. The method of claim 9, wherein M is equal to 1.

12. The method of claim 1, wherein the data is divided into multiple blocks, and wherein the method is performed to transmit each of the blocks.

13. The method of claim 11, wherein the data is divided into blocks based on a quantity of the plurality of channels.

14. The method of claim 1, wherein the block of data can be transmitted from a computing device implementing the method to the base station without the computing device and the base station exchanging scheduling communications or overhead communications.

15. A system for transmitting a block of data to a base station, the system comprising:
 a processor; and
 a memory storing instructions which, when executed by the processor, cause the processor to:
  divide the block of data into a first subblock and a second subblock;
  select, based on the second subblock, a selected channel from among a plurality of channels;
  modulate the first subblock onto the selected channel to generate a modulated subblock; and
  transmit the modulated subblock to the base station.

16. The system of claim 15, wherein the selected channel is selected from among the plurality of channels based on contents of the second subblock.

17. The system of claim 16, wherein the selected channel corresponds to the contents of the second subblock in an index mapping table.

18. The system of claim 15, wherein the plurality of channels are at least a subset of a wireless communication spectrum.

19. The system of claim 18, wherein the wireless communication spectrum is divided into a plurality of chunks.

20. The system of claim 19, wherein the plurality of chunks includes a first chunk assigned to the system and wherein the plurality of channels correspond to the first chunk.

* * * * *